United States Patent [19]

Hansson

[11] Patent Number: 4,989,652
[45] Date of Patent: Feb. 5, 1991

[54] ROTOR FOR CRANE-MOUNTED WORKING IMPLEMENTS, ESPECIALLY TREE-PROCESSING UNITS

[75] Inventor: Rolf Hansson, Dalsjöfors, Sweden
[73] Assignee: OSA AB, Alfta, Sweden
[21] Appl. No.: 399,540
[22] PCT Filed: Nov. 23, 1988
[86] PCT No.: PCT/SE88/00635
  § 371 Date: Sep. 13, 1989
  § 102(e) Date: Sep. 13, 1989
[87] PCT Pub. No.: WO89/06216
  PCT Pub. Date: Jul. 13, 1989

[30] Foreign Application Priority Data

Dec. 28, 1987 [SE] Sweden ................. 8705170

[51] Int. Cl.$^5$ ............... A01G 23/08; B66C 13/08; F15B 13/12
[52] U.S. Cl. ................. 144/34 R; 92/106; 92/116; 144/336
[58] Field of Search ........... 144/34 R, 34 E, 3 D, 144/335, 336, 339; 92/106, 116

[56] References Cited

U.S. PATENT DOCUMENTS 4,083,463 4/1978 Ericsson ............... 144/34 R
4,800,936 1/1989 Pomies et al. ........... 144/34 R

FOREIGN PATENT DOCUMENTS 3146695 7/1983 Denmark .

*Primary Examiner*—W. Donald Bray
*Attorney, Agent, or Firm*—McFadden, Fincham, Marcus & Allen

[57] ABSTRACT

A rotator for crane-mounted working implements comprises a housing (7) swingably connectible with the tip of the crane via a joint, and a pivot shaft (8) connectible with the working implement and pivotal relative to said housing by means of at least one vane or flap (10) operating in a chamber and dividing said chamber into two operating chambers which can be supplied with, or evacuated of, hydraulic medium via two first ducts (12) provided in said housing, said pivot shaft including second hydraulic medium through-ducts (17, 17') opening into annular hollow spaces (16, 16') in a swivel connection (15) incorporated in said housing. Between said first ducts (12) in the housing and the annular hollow spaces (16, 16') of the swivel connection (15), branch ducts (20) are provided for establishing communication between said first and said second ducts (12, 17) for supplying hydraulic medium to the rotator working chambers via said shaft (8), thereby eliminating the need for any hydraulic medium connection on the outside of the rotator housing.

2 Claims, 2 Drawing Sheets

ROTOR FOR CRANE-MOUNTED WORKING IMPLEMENTS, ESPECIALLY TREE-PROCESSING UNITS

TECHNICAL FIELD OF THE INVENTION

This invention relates to a rotor for crane-mounted working implements, especially tree-processing units, comprising a housing swingably connectable with the tip of the crane via a joint, and a pivot shaft connectable with the working implement and pivotal relative to said housing by means of at least one vane or flap operating in a chamber and dividing said chamber into two operating or sub-chambers which can be supplied with, or evacuated of, hydraulic medium via two first ducts provided in said housing, said pivot shaft including second hydraulic medium through-ducts opening into annular hollow spaces in a swivel connection incorporated in said housing.

BACKGROUND ART

Conventional rotators of the above type comprise two types of conduits, viz. a first pair of hoses for supplying (supply and evacuation) the rotor working chamber with hydraulic oil, and a second pair of hoses for supplying one or more hydraulic cylinders for the moving parts of the working implement, viz. via the swivel connection and the ducts opening thereinto and extending inwardly through the pivot axis of the rotor down to suitable connections on the implement. Both pairs of hoses are connected to the outer side of the rotor top via protruding angular nipples which of necessity are mounted on the outside of the essentially cylindrical surface extending downwardly a distance from the flat upper side of the rotor housing because the space above the flat upper side is mainly taken up by the joint by which the rotor is attached to the crane tip. In the last few years, the hydraulic oil supply hoses to the working implement have been run from the pump and the associated tank on the vehicle which carries the crane, directly to the working implement, and not via the swivel connection in the rotor. In these cases, the connection holes for this pair of hoses were plugged. Nevertheless, there always remained on the housing or the top of the rotor the two nipple-connected oil supply hoses to the rotor proper, and in practice these hoses constitute a problem of considerable difficulty when the working implement is a tree-processing unit, for example a grapple harvester which, on certain occasions, must hold a stem in a vertical position during movement from one angular position to another by means of the rotor. On such occasions, it frequently happens that the stem comes into contact both with the nipples radially protruding from the rotor top and with the hoses connected with the nipples. As a result, damage is done not only to the stem (gashes in the surface wood with the ensuing loss of quality) but also to the hoses and the nipples. This means that the nipples must be frequently serviced, which is expensive, and if the damage is so serious that leakage occurs, the tree-processing unit is no longer safe to operate.

BRIEF ACCOUNT OF THE INVENTIVE CONCEPT

The present invention aims at obviating the above-mentioned problem and at providing, by simple means, a rotor with which hose damage of the type referred to is positively precluded. This is achieved, in accordance with the invention, in that there are provided, between said first ducts in the housing and the annular hollow spaces of said swivel connection, branch ducts establishing communication between said first and said second ducts for supplying hydraulic medium to the rotor working chambers via said shaft, thereby eliminating the need for any hydraulic medium connection on the outside of the rotor housing.

BRIEF DESCRIPTION OF THE ACCOMPANYING DRAWINGS

DETAILED DESCRIPTION OF A PREFERRED EMBODIMENT OF THE INVENTION

Figure 1:
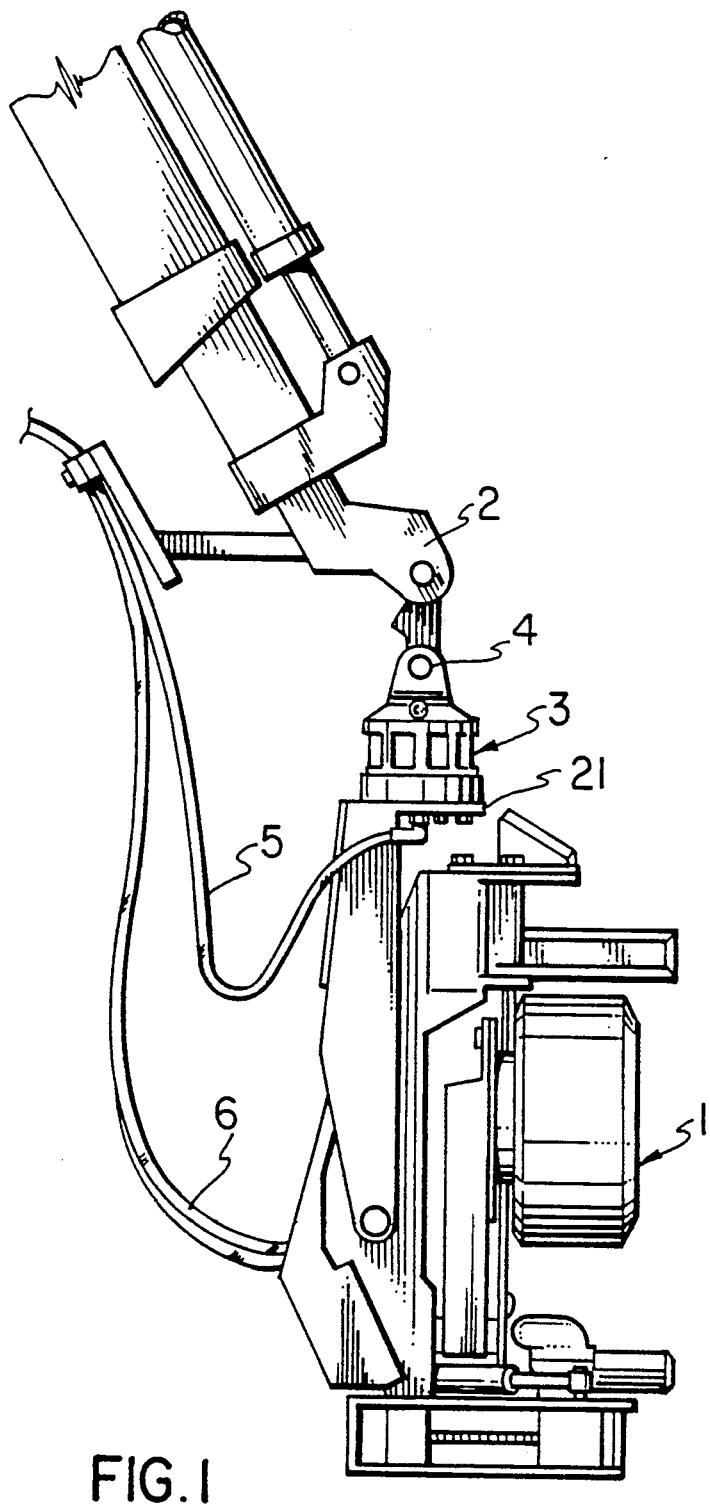
FIG. 1 is a simplified lateral view of a grapple harvester connected with the tip of a crane by means of a rotator according to the invention.

In FIG. 1, reference numeral 1 generally designates a working implement in the form of a grapple harvester hanging from the tip 2 of a crane by means of a rotator designated 3 in its entirety. More particularly, the rotator is hanging in a joint 4 permitting the implement 1 to swing relative to the crane tip. The rotator 3 also permits the implement to pivot in known manner relative to the crane tip. A first pair of hydraulic hoses 5 supply the rotator with hydraulic oil, while a second pair of hoses 6 supply hydraulic oil to the moving parts of the unit 1. These hoses are connected to a pump and a hose, respectively, on a vehicle (not shown) on which the crane is mounted.

Figure 2:
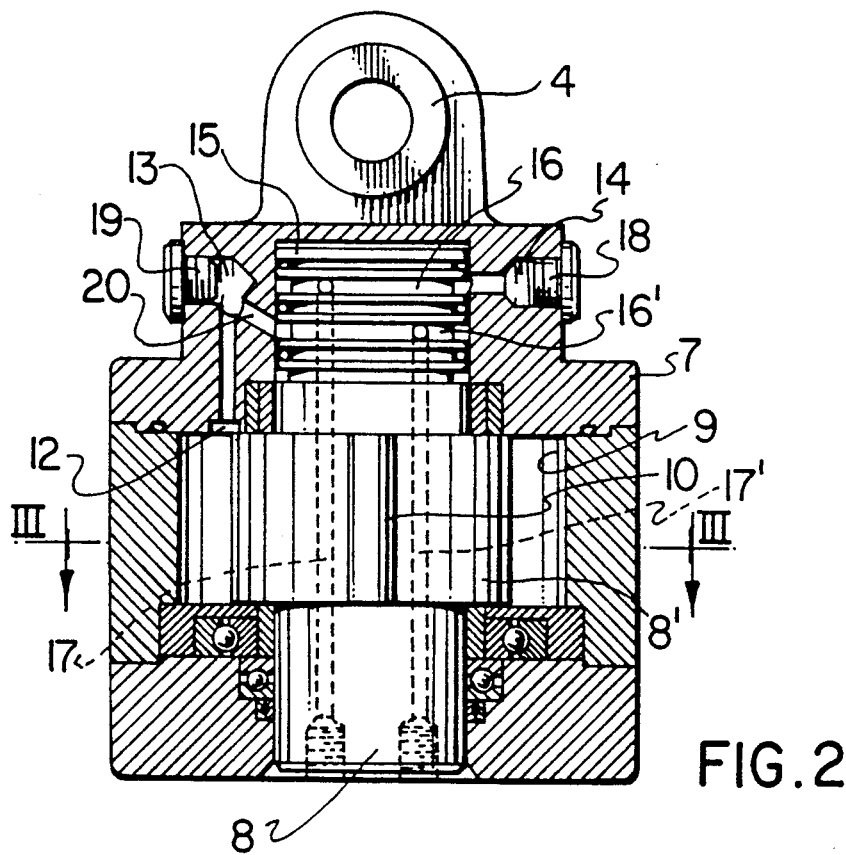
FIG. 2 is a vertical section of the rotator according to the invention.
Figure 3:
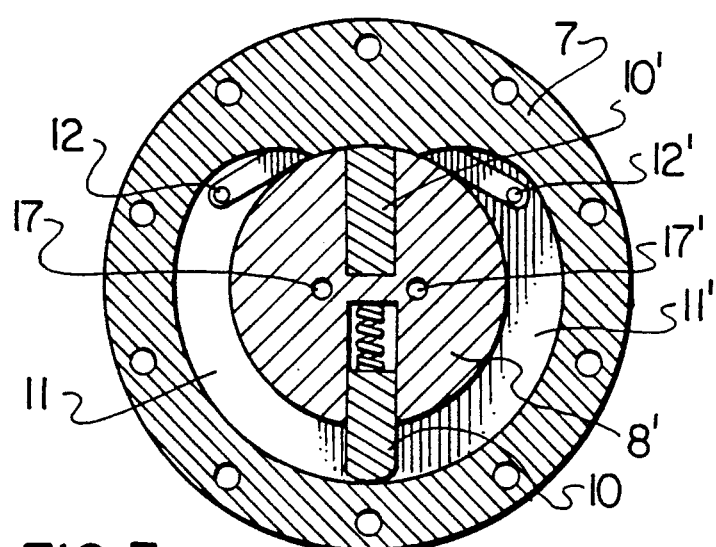
FIG. 3 is a horizontal cross-sectional view on line III—III in FIG. 2.

FIGS. 2 and 3 illustrate in more detail the construction of the rotator 3. The rotator comprises a top or housing 7 within which a shaft 8 is rotatably mounted by means of suitable bearings and gaskets. In the area of a hollow space 9, the shaft 8 has a thickened portion 8' in which two spring-loaded vanes 10, 10' are mounted and divide the hollow space 9 into at least two working or sub-chambers 11, 11'. Oil is supplied to, and evacuated from, each of these working chambers 11, 11' via first ducts 12, 12' formed in the housing top.

In FIG. 2, reference numeral 13 designates one of two bores to which two hydraulic hoses could be connected in conventional manner via nipples. On conventional rotators, these two hoses and bores serve to supply the working chambers of the rotator with oil, more particularly via the ducts 12, 12'. Reference numeral 14 designates one of two similar bores which also could be connected to a pair of hydraulic hoses for supplying oil to the working implement via a swivel connection which is designated 15 in its entirety and which comprises at least two annular hollow spaces 16, 16' communicating, at different levels, with two second ducts 17, 17' formed in the pivot shaft 8. However, in the embodiment illustrated, not only the two bores 14 (only one is shown in FIG. 2) but also the two bores 13 (only one is shown in FIG. 2) are plugged by means of plugs 18, 19 or permanently closed in some other manner. In addition, there is provided, according to the principle of the invention, a branch duct 20 between the annular hollow space 16' to the swivel connection 15 and the bore 13 which in turn communicates with one of the rotator working chambers via the duct 12. Similarly, a branch duct (not shown) is provided between the second annular hollow space 16 and the second (not shown) bore 13 which in turn communicates with the duct 12' of the second rotator working chamber.

By providing, in accordance with the invention, branch ducts 20 between on the one hand the first ducts 12, 12' of the rotator working chambers and, on the other hand, the second ducts 17, 17' within the pivot shaft 8, viz. via the annular hollow spaces 16, 16' of the swivel connection 15, the ducts 17, 17' in the pivot shaft can be used for supplying oil to the rotator working chambers, more particularly via the two hoses 5 extending from the pump and the tank on the vehicle to the lower side of an attachment plate 21 by which the implement 1 is mounted on the pivot shaft 8. In this manner, there is no need for a hose connection on the outside of the rotator top or housing, and all supply of oil to the rotator working chambers occurs via the ducts in the pivot shaft of the rotator.

I claim:

1. In a rotator for a crane mounted device, in which said crane includes a crane tip and said rotator includes a housing connected with said crane tip, and wherein said rotator has a pivot shaft pivotable relative to said housing, a chamber within said housing, said chamber having at least one vane dividing said chamber into at least two sub-chambers, a pair of first duct means in said housing for supplying said sub-chambers with and evacuating said sub-chambers of a hydraulic medium, a swivel connection in said housing, said swivel connection having at least two hollow chambers, and said pivot shaft including second duct means in fluid communication with said hollow chambers, the improvement wherein said rotator includes branch duct means in fluid communication between said first duct means and said hollow chambers of said housing, said branch duct means allowing fluid communication between said first and said second duct means to thereby supply hydraulic medium to said sub-chambers via said pivot shaft thereby eliminating external hydraulic medium connections on the outside of said housing.

2. The apparatus as claimed in claim 1, wherein said second duct means comprises a pair of ducts.

* * * * *

UNITED STATES PATENT AND TRADEMARK OFFICE
CERTIFICATE OF CORRECTION

PATENT NO. : 4,989,652
DATED : February 5, 1991
INVENTOR(S) : Rolf Hansson

It is certified that error appears in the above-indentified patent and that said Letters Patent is hereby corrected as shown below:

On the Title page, item [54], Title should read
--Rotator for Crane-Mounted Working Implements,
Especially Tree-Processing Units--.

Signed and Sealed this

Nineteenth Day of March, 1996

Attest:

BRUCE LEHMAN

Attesting Officer           Commissioner of Patents and Trademarks